UNITED STATES PATENT OFFICE.

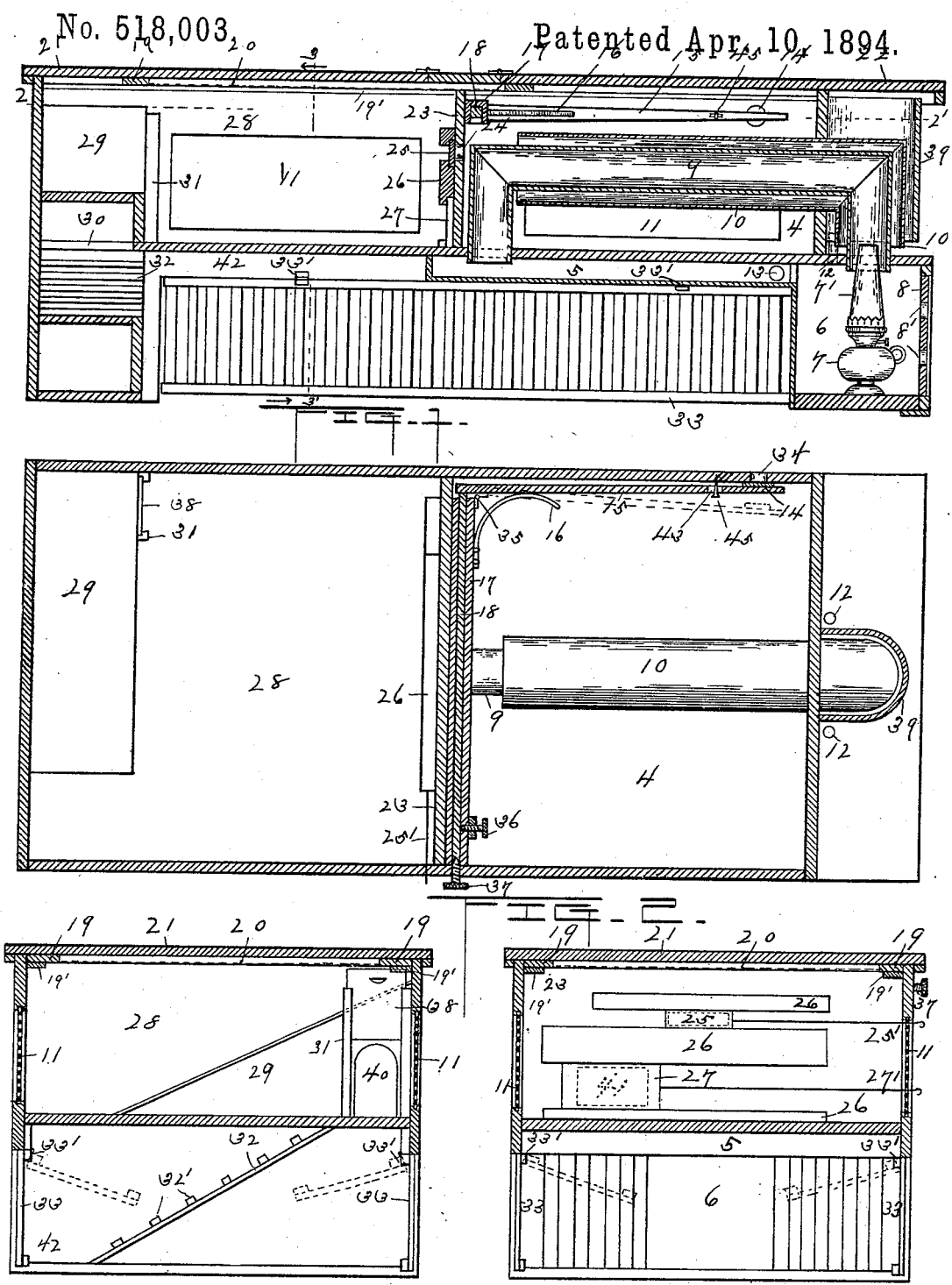

SAMUEL Q. DUNCAN, OF GREENFIELD, OHIO, ASSIGNOR TO THE COLUMBIAN MANUFACTURING COMPANY, OF SAME PLACE.

BROODER.

SPECIFICATION forming part of Letters Patent No. 518,003, dated April 10, 1894.

Application filed February 23, 1893. Serial No. 463,343. (No model.)

*To all whom it may concern:*

Be it known that I, SAMUEL Q. DUNCAN, a citizen of the United States, residing at Greenfield, in the county of Highland and State of Ohio, have invented certain new and useful Improvements in Brooders, of which the following is a specification, reference being had to the accompanying drawings.

This invention relates to brooders for chickens and other domestic fowls, and its object is to produce an improved brooder of the character described, and the novelty of the invention will be hereinafter fully set forth, and specifically pointed out in the claims.

In the accompanying drawings Figure 1 is a central vertical section of a brooder embodying my invention. Fig. 2 is a top or plan view taken in section on the line 2 2' of Fig. 1. Fig. 3 is a vertical cross-section taken on the line 3 3' of Fig. 1, and looking in the direction of the arrow at 3. Fig. 4 is a vertical cross-section also taken on the line 3 3' of Fig. 1, and looking in the direction of the arrow at 3'.

The brooder represented in the accompanying drawings is provided with lids or top doors 21 and 22, which are hinged at their inner ends, respectively, and may be raised or opened in order to gain access to the upper chambers of the brooder. Beneath the lid 22 is the chamber 4 which is to be heated, as hereinafter set forth, to a degree adapted to the comfort of the chicks. Just beneath the chamber 4 is a shallow chamber or compartment 5, which communicates with the upper part of the lamp-box, 6. The latter is provided with a lamp 7, with the metallic chimney 7'. A pipe 9 projects upward from the top of lamp-box 6, then forms an angle and enters the brooder-chamber 4, and after traversing the greater part of said chamber it forms another angle and turns downward, passing through the floor of chamber 4 and terminating in the shallow chamber 5. This pipe receives the top of chimney 7' and forms a flue to carry off the smoke and gas from the lamp, and when heated its radiation raises the temperature of the brooder-chamber 4 to the proper degree. The shallow compartment 5 receives the draft from the lamp through pipe 9, and being thus filled with warm air, imparts warmth in turn to the floor of chamber 4. By this arrangement the heated air which has passed through pipe 9 is again utilized, and the greatest amount of heat is secured from a given quantity of oil in lamp 7. The heated floor of brooder-chamber 4 adds greatly to the comfort of the chicks. The heat from pipe 9 naturally rises to the top of chamber 4, and the heated air in chamber 5, also naturally rising, gives the proper degree of warmth to the floor of chamber 4. Chamber 5 has openings or air-ports 13 in either side for the escape of the smoke and vapors from the lamp. Lamp-box 6 has short discharge tubes or pipes 12 extending upward from its top, which also serve to discharge the heated gaseous air which has passed through pipe 9 and returned to lamp-box 6. The lamp-box is provided with a hinged door 8 with openings or air-ports 8' for supplying fresh air to lamp 7. Chamber or compartment 5 communicates with lamp-box 6 in order that the circuit of the draft from lamp 7 may be completed, thus insuring greater steadiness and evenness to the flame of the lamp. With this arrangement the brooder may be safely left out of doors even in windy weather, whereas if the circuit of the draft from lamp 7 were not completed the flame would be unsteady or perhaps totally extinguished. A pipe 10, which is greater in diameter than pipe 9, surrounds and envelops a portion of said pipe, and extends from a point above lamp-box 6 to a point within brooder-chamber 4. This pipe 10 is open at both ends, and is used for the purpose of supplying fresh air to brooder-chamber 4 and also for the purpose of causing said fresh air to be heated before it enters the chamber and comes in contact with the chicks. The air in passing through pipe 10 is brought in immediate contact with the hot air pipe 9 and is thoroughly heated before it reaches the interior of chamber 4. A shield 39 surrounds the outer portion of pipe 10 and protects it from the open air, thus preventing radiation and waste of heat. Said shield, however, is open at its lower end in order to admit a constant supply of fresh air to the outer end of pipe 10.

In the side of chamber 4 is an opening or air-port 34, which is normally closed by valve 14. This valve is carried on the free end of arm 15, and said arm is pivoted at a point near the end farthest from valve 14. Arm 15 is slotted at 43 to receive the supporting pin or guide 45, and is normally held in position by the tension of spring 16. The pivotal point of arm 15 in this instance is the center of hinge 35, which hinge connects said arm with the casing. A thermostatic bar 18, which may be made of any material susceptible to changes of temperature, is incased in hollow bar 17, said bar 17 being rigidly secured to the casing of the brooder. One end of bar 18 is normally in contact with the end of arm 15, while the other end contacts with the end of an adjusting screw 37. A set-screw 36 bears upon and holds bar 18 in position.

In order to adjust the bar 18 a thermometer (not shown in the drawings) is placed inside the brooder-chamber 4, and the temperature of said chamber is brought up to the proper degree, by means of lamp 7 and the pipes already described, whereupon the screw 37, which has a threaded bearing in the casing of the brooder, is turned until the bar 18, is forced against the end of arm 15, thus moving the latter upon its pivotal point against the tension of spring 16, and carrying valve 14 away from the air-port 34, as shown in dotted lines in Fig. 2. Screw 37 is then turned in the opposite direction until valve 14 just reaches and closes port 34, whereupon set-screw 36 is turned, thus clamping bar 18 in position. It is obvious that the bar 18, the under part of which is exposed to the air in chamber 4, now contacts firmly with the end of arm 15, and any rise in temperature will cause said consequent expansion of bar 18 will cause said arm 15 to move upon its pivotal point and open air-port 34, whereupon warm air will pass out at said port and fresh air will enter through pipe 10, thus lowering the temperature, and said arm 18, in contracting, will permit spring 16 to close said port 34, thus automatically and continually regulating the temperature of chamber 4, as will be readily understood. The pivotal point of arm 15 should be near the end with which bar 18 comes in contact, in order that valve 14 may move through a much greater distance than the opposite end of arm 15, thus allowing a very small amount of expansion of bar 18 to open port 34. A partition wall 23 is placed between chambers 4 and 28, and said partition has an air-port 24 for admitting warm air from chamber 4 to chamber or compartment 28, said air-port being opened or closed by a slide 25 which moves in suitable guides 26. Partition 23 also has a doorway 41 for the chicks (shown in dotted lines in Fig. 4), which is opened or closed by means of sliding door 27. Slide 25 and door 27 have operating rods 25' and 27' which extend out through the casing of the brooder.

Just beneath the lids or top doors of the brooder is a sliding frame 19, supported by suitable cleats 19', which carries wire cloth or other netting 20 (represented by dotted lines), and said frame may be moved or shifted to either end of the brooder and made to cover or close either compartment 4 or 28. The netting 20, while admitting the warm sunshine and fresh air when the top door is opened, protects the chicks from any enemy outside the brooder.

Chambers 4 and 28 have glass windows 11 in either side. Chamber or compartment 28, which is principally used for feeding purposes, has a box 29 at the end opposite the sliding door 27. This box has a doorway 40 for the chicks, which is closed by the sliding door 38. Said door is held by vertical guides 31. The bottom or under side of box 29, which is simply a continuation or portion of the floor of compartment 28, has an opening or passage-way 30 leading to the inclined walk or stairway 32. Box 29 thus communicates with the lower or ground compartment 42. Said compartment 42 has a hinged rack or open work 33 at either side, the hinges being represented at 33'. This rack or open work may be swung about its hinges inwardly, as indicated by the dotted lines in Figs. 3 and 4.

From the foregoing description it will be evident that by means of door 27 the fowls may be confined to the warm brooder-chamber 4. By opening door 27 they may be admitted to the feeding compartment 28. By opening door 38 they may be allowed to pass down to the ground-compartment 42. By opening the racks 33 they may be given an exit from the brooder entirely. And by means of the appliances already named they may be confined to any chamber or compartment desired.

Having thus described my invention, what I claim as new, and desire to secure by Letters Patent, is—

1. In a brooder, a brooder-chamber 4, a chamber or compartment 5 beneath said brooder-chamber, said chambers adjoining each other vertically and being separated by the floor of chamber 4, and a hot air pipe 9 passing through said brooder-chamber and terminating in said compartment 5, whereby the heated air, before being discharged from the brooder, passes under and heats the floor of brooder-chamber 4, all in combination substantially as set forth.

2. In a brooder, a lamp-box 6, a brooder-chamber 4, a hot air pipe 9 forming a flue, said pipe 9 extending from said lamp-box and passing through said brooder-chamber, and a fresh air pipe 10 surrounding said pipe 9, said pipe 10 extending from a point outside of chamber 4 to a point within said chamber, whereby the fresh air, in passing through said pipe 10, is heated before it reaches the interior of said chamber, all in combination substantially as set forth.

3. In a brooder, a lamp-box 6, a brooder-chamber 4, a chamber or compartment 5 beneath said chamber 4 and separated therefrom by the floor of chamber 4, and a pipe 9 forming a flue, said pipe 9 extending from the top of said lamp-box, passing through said chamber 4, and terminating in said chamber or compartment 5, all in combination substantially as set forth.

4. In a brooder, a lamp-box 6, a brooder-chamber 4, a chamber or compartment 5 beneath said chamber 4, a pipe 9 forming a flue, said pipe 9 extending from the top of said lamp-box, passing through said chamber 4, and terminating in said chamber or compartment 5, and a fresh air pipe 10, said pipe 10 surrounding a portion of pipe 9 and extending from a point outside of chamber 4 to a point within said chamber, whereby the fresh air, in passing through pipe 10, is heated before it reaches the interior of brooder-chamber 4, all in combination substantially as set forth.

5. In a brooder, a lamp-box 6, a brooder-chamber 4, a chamber or compartment 5, said chamber or compartment 5 being beneath said chamber 4 and communicating with said lamp-box 6, and a pipe 9 forming a flue, said pipe extending from the top of said lamp-box, passing through said chamber 4, and terminating in said chamber or compartment 5, whereby the circuit of the draft from the lamp is completed, all in combination substantially as set forth.

6. In a brooder, a lamp-box 6 having the discharge tubes 12, the brooder-chamber 4, the chamber or compartment 5 communicating with said lamp-box, and the pipe 9 forming a flue, said pipe extending from the top of said lamp-box, passing through said chamber 4, and terminating in said chamber or compartment 5, all in combination substantially as set forth.

7. In a brooder, a lamp-box 6, a brooder-chamber 4, a chamber or compartment 5 communicating with said lamp-box 6, a pipe 9 forming a flue, said pipe extending from the top of the lamp-box, passing through said chamber 4, and terminating in said chamber or compartment 5, for the purpose specified, and a fresh air pipe 10 surrounding a portion of said pipe 9, whereby the fresh air, in passing through said pipe 10, is heated before it reaches the interior of brooder-chamber 4, all in combination substantially as set forth.

8. In a brooder, the combination with the compartment 28, of a compartment 4, said compartments being connected by a doorway with a sliding door, and said compartment 4 being provided with a heating pipe forming a flue from the lamp, with a fresh air pipe surrounding said heating pipe, and a shifting frame 19, provided with netting, supported above said compartments, substantially as described.

9. In a brooder, the combination with a compartment 28, having a hinged lid 21, of an adjoining compartment 4, having a hinged lid 22, said compartments being connected by a doorway and door, and a shifting frame 19, provided with netting, supported upon cleats just beneath said lids and adapted to be shifted to either end of the brooder so as to cover or close either of said compartments as desired, substantially as described.

10. In a brooder, the lamp-box 6, having a hinged door 8 with openings 8', and having the discharge tubes 12, the brooder-chamber 4, the shallow chamber or compartment 5 communicating with said lamp-box, the lamp 7, the pipe 9, arranged as specified, the pipe 10, encircling pipe 9 and open at both ends, for the purpose set forth, the partition 23, having the air-port 24 and the doorway 41, controlled, respectively, by slide 25 and sliding door 27, the feeding compartment 28, having the box 29, said box having a doorway 40, controlled by sliding door 38, the inclined walk or stairway 32, leading down to the ground compartment 42, and the hinged racks 33, all in combination substantially as set forth.

In testimony whereof I affix my signature in presence of two witnesses.

SAMUEL Q. DUNCAN.

Witnesses:
T. S. McGARRAUGH,
ALBERT M. MACKERLEY.